Figure 1:
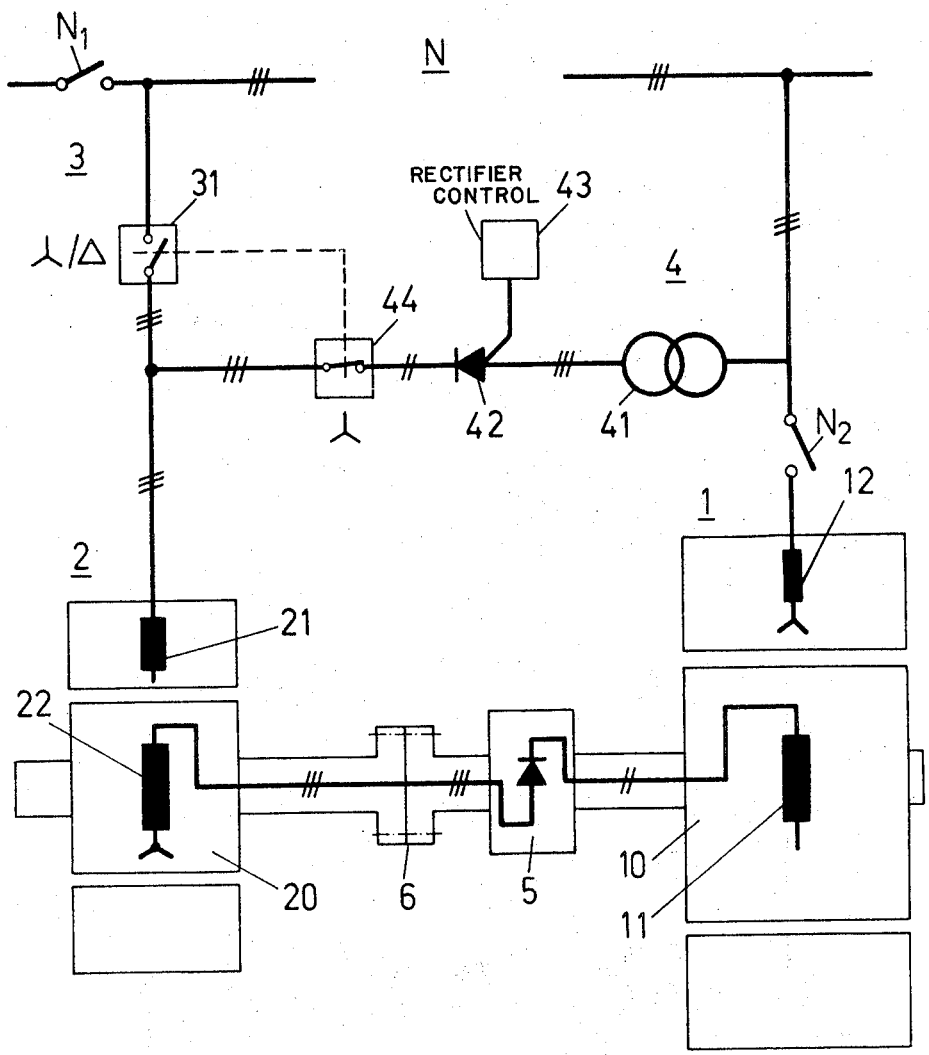

United States Patent [19]
Sapper

[11] 3,823,357
[45] July 9, 1974

[54] STARTING DEVICE FOR A SYNCHRONOUS MACHINE

[75] Inventor: Jorg Sapper, Windisch, Switzerland

[73] Assignee: Brown Boveri & Company Limited, Baden, Switzerland

[22] Filed: Jan. 23, 1973

[21] Appl. No.: 326,000

[30] Foreign Application Priority Data
Feb. 7, 1972 Switzerland.......................... 1685/72

[52] U.S. Cl.............................. 318/183, 318/190
[51] Int. Cl............................................. H02p 1/50
[58] Field of Search........ 318/49, 89, 183, 190–193; 310/232, 240

[56] References Cited
UNITED STATES PATENTS

| | | | |
|---|---|---|---|
| 1,617,092 | 2/1927 | Yamamoto et al. ............. | 318/192 X |
| 1,661,014 | 2/1928 | Schmock ........................ | 310/240 X |
| 1,723,906 | 8/1929 | Alexanderson ................... | 318/49 X |
| 3,242,362 | 3/1966 | Ciliax............................. | 310/240 X |
| 3,462,669 | 8/1969 | Picozzi........................... | 318/193 X |

Primary Examiner—Gene Z. Rubinson
Attorney, Agent, or Firm—Pierce, Scheffler & Parker

[57] ABSTRACT

A starting arrangement for a polyphase synchronous machine includes a polyphase induction machine having a wound rotor which is coupled to the rotor of the synchronous machine for rotation therewith. The rotor winding of the induction machine is closeable through a starting load-circuit, switching means are provided for switching over the stator winding of the induction machine from its connection to a polyphase alternating current supply source to a direct current excitation, and the rotor winding of the induction machine is connected to the rotor winding of the synchronous machine through a rectifier.

4 Claims, 7 Drawing Figures

STARTING DEVICE FOR A SYNCHRONOUS MACHINE

The invention relates to a starting device for a synchronous machine with an induction machine, the rotor of which is connected to the rotor of the synchronous machine for joint rotation therewith, and which comprises a stator winding, which can be connected to a polyphase alternating-current supply, as well as a rotor winding which can be closed through at least one starting load-circuit.

Synchronous motors with high outputs and large phase advancers need a separate drive for starting from a standstill until the synchronous speed or a substantially synchronous speed is reached, at which taking over the load or connection into the mains is possible without falling out of synchronism. The same also applies to synchronous generators, the main drive of which is not itself capable of starting and of accelerating the large rotor masses of the synchronous machine from a standstill or from low speeds, that is to say in the case of gas-turbo generators and the like. For relatively large synchronous machines, the starting is usually carried out with slipring induction motors and starting resistors. This involves a corresponding structural expense just for the starting. The same also applies to starting devices with constant-speed auxiliary motors — electric motors, Diesel engines or the like — and coupling to the synchronous machine through a fluid torque converter or a hydraulic coupling. A disadvantage of the above-mentioned solution is the disproportionate increase in the structural length of the whole generator set as a result of the starting machine or of the torque converter which is present in addition.

Furthermore, a squirrel-cage induction motor with pole changing may be considered for the starting. It is true that torque-speed matching can thus be achieved during the starting operation, and hence a reduction in the acceleration-slip energy converted into heat, but only in rough steps and with considerable structural expense for the changeover switches. In addition, the pole-changing winding construction of the starting motor leads to increased expenditure.

Furthermore, auxiliary drives with speed regulation in the form of a Ward-Leonard set may be considered. It is true that acceleration can thus be achieved without energy loss, but without intermediate gearing only up to comparatively low outputs and speeds, the latter in view of the commutators of the direct-current generator set. In addition, in itself a Ward-Leonard set already represents an expensive device which is avoided if possible for an auxiliary drive.

Finally, there is also the possibility of frequency starting for synchronous motors, in which case a polyphase feed current with rising frequency is supplied by a controllable frequency generator or a corresponding alternating-current frequency converter. It is a prerequisite for this solution, however, that the synchronous machine can be excited already when at a standstill. If a starting device is present whereby the synchronous machine can be brought up to a few percent of its rated speed, then an induction generator driven at constant speed can be used to feed the three-phase winding of the synchronous machine during the run-up (Unger machine). The expenditure necessary here, on the one hand for the starting device and on the other hand for a complete auxiliary drive unit with motor and induction generator, is likewise undesirable, however.

It is therefore the object of the invention to provide a starting device for synchronous machines which is distinguished by low constructional expense and the possibility of a compact form of construction while also being able to be used for comparatively high machine performances. According to the invention, the solution to this problem is characterised, in a starting device of the kind referred to at the beginning, in that the stator winding of the induction machine can be switched over from the polyphase alternating-current supply allocated to the asynchronous starting-motor operating condition to a direct-current excitation allocated to the synchronous exciting-generator operating condition, and that, in the exciting-generator operating condition, the rotor winding of the induction machine is connected to the exciting winding of the synchronous machine through a rectifier.

With a starting device thus constructed, the expenditure is already reduced considerably as a result of the fact that the induction machine does not represent an additional unit for the starting drive but at the same time takes over the function of an exciter following on the starting. In this case the supply of exciting current to the rotor winding of the synchronous machine can be effected without slip rings, so that the advantage of particularly reduced structural expenditure in this respect and of freedom from wear is afforded. Adequate scope is therefore available for the dimensioning of the induction machine and of the starting resistors which are necessary in the case of resistance starting, and the total expenditure is further reduced in comparison with a construction with exciter and additional auxiliary drive.

Within certain limits of power, a particularly favourable construction of the starting device according to the invention is obtained with regard to the cost of construction as a result of the fact that the exciting circuit of the synchronous machine is adapted as a starting load-circuit for the rotor winding of the induction machine. As a result, the expense of starting resistors and possibly a cooling device is eliminated because the spatially extended exciting circuit of the synchronous machine takes over the heat transformation of the slip energy. Because of the comparatively large surface of the machine parts carrying the rotor circuit of the synchronous machine, there is a natural cooling which is sufficient in many cases.

On the other hand, for relatively high powers, a starting load-circuit may be provided which is operationally connected to the rotor circuit of the induction machine through a set of slip rings. A set of brushes which can be lifted may then appropriately be used, which is only effective during the starting operation and is not subject to any wear during normal operation. Furthermore, the starting load-circuit may be connected not only in the usual manner to the rotor winding of the induction machine, that is to say at the alternating-current side of the rectifier, but also to the exciting winding of the synchronous machine, that is to say at the direct-current side of the rectifier. In this case, by appropriate dimensioning, the acceleration-slip energy can be distributed in a suitable manner between the starting load-circuit connected up through slip rings on the one hand and the exciting winding of the synchronous machine on the other hand.

According to an advantageous further development of the invention, a switch which is connected to the rotor system of synchronous machine and induction machine for rotation therewith is provided in the exciting circuit of the synchronous machine to separate the exciting winding of the synchronous machine from the rotor circuit of the induction machine during a starting phase. By means of such a switch, which is actuated for example by external control intervention or automatically when a predetermined rotor speed is reached, an optimum design can be realized for the starting range on the one hand and the normal operation with excitation of the synchronous machine on the other hand, without considerable constructional expense and space requirements. The switching off of a stationary starting resistor system, connected up through slip rings, can be achieved by means of the brushes already mentioned, which can be lifted. According to another embodiment of the invention, however, a starting-resistor system is provided which is mechanically connected to the rotor system of induction machine and synchronous machine for rotation therewith and is operationally connected to the rotor winding of the induction machine. This leads to a particularly high operational reliability and long life because of the absence of the slip rings which are liable to wear. Furthermore, a co-rotating, automatically actuated switch can likewise be used here to advantage for switching off the starting-resistor system.

Figure 3:
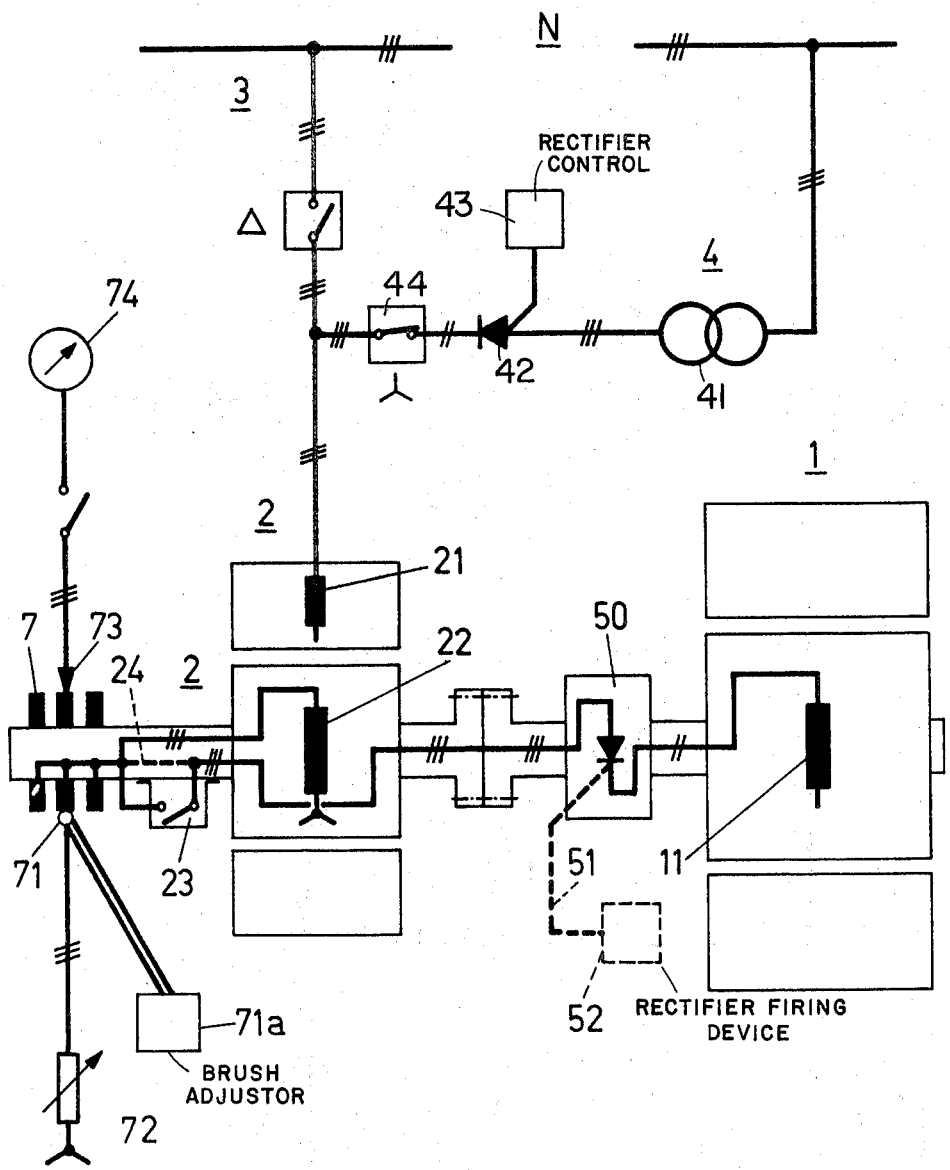
Figure 4:
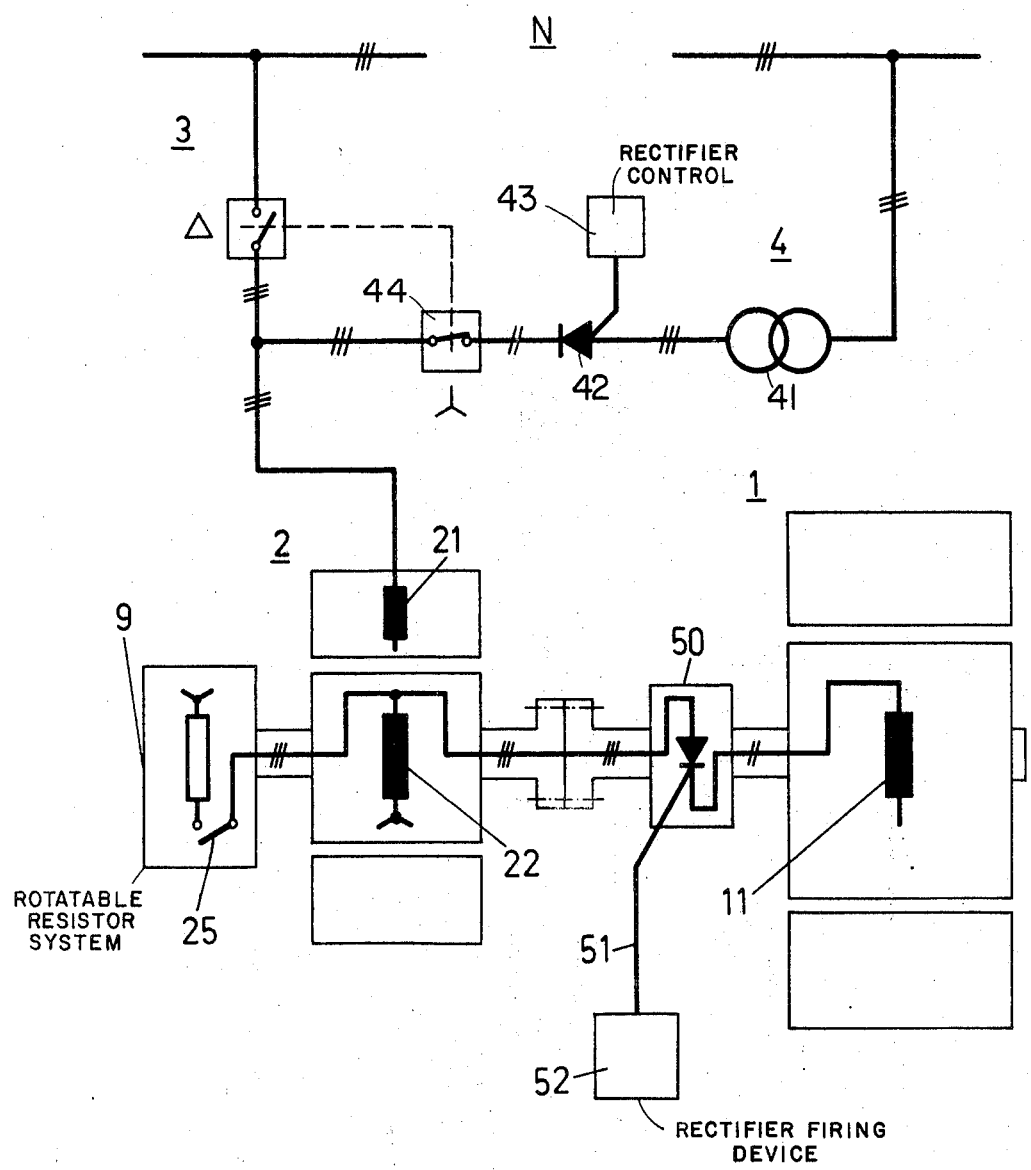
Figure 5:
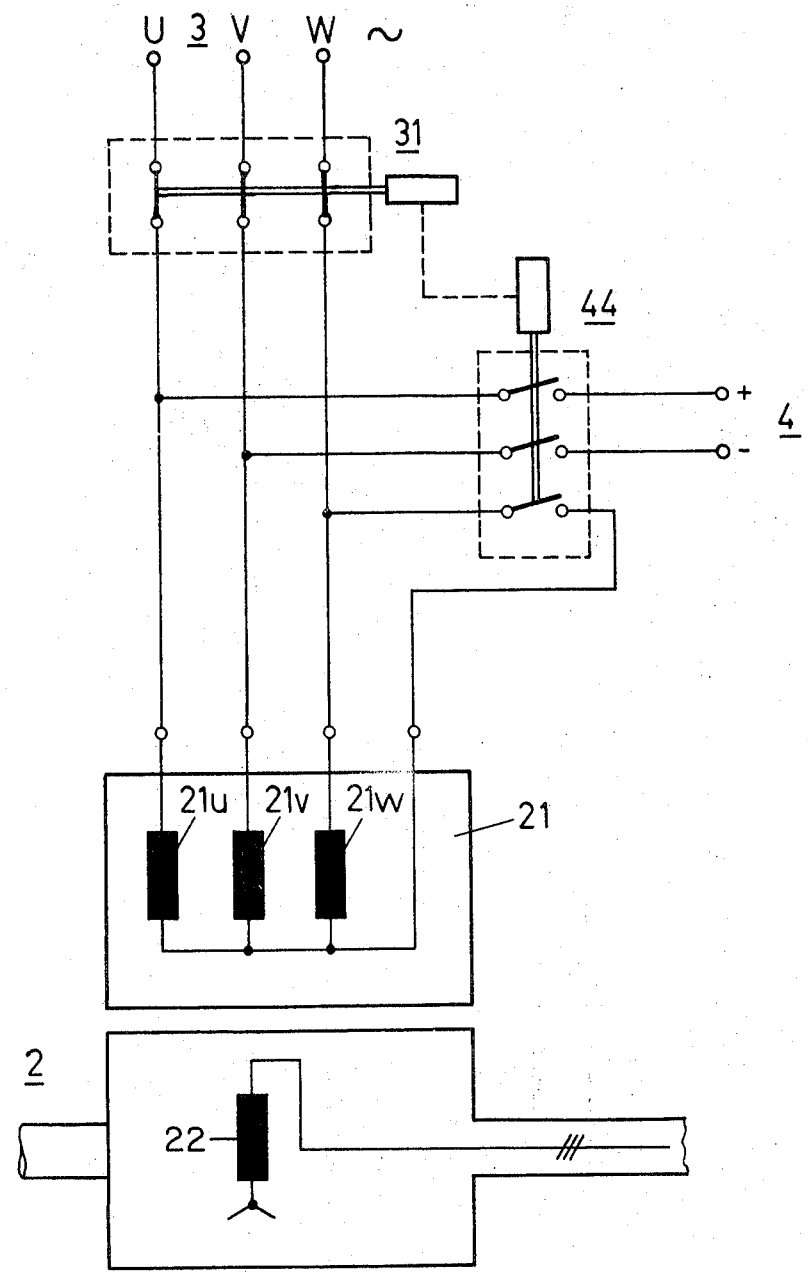
Figure 6:
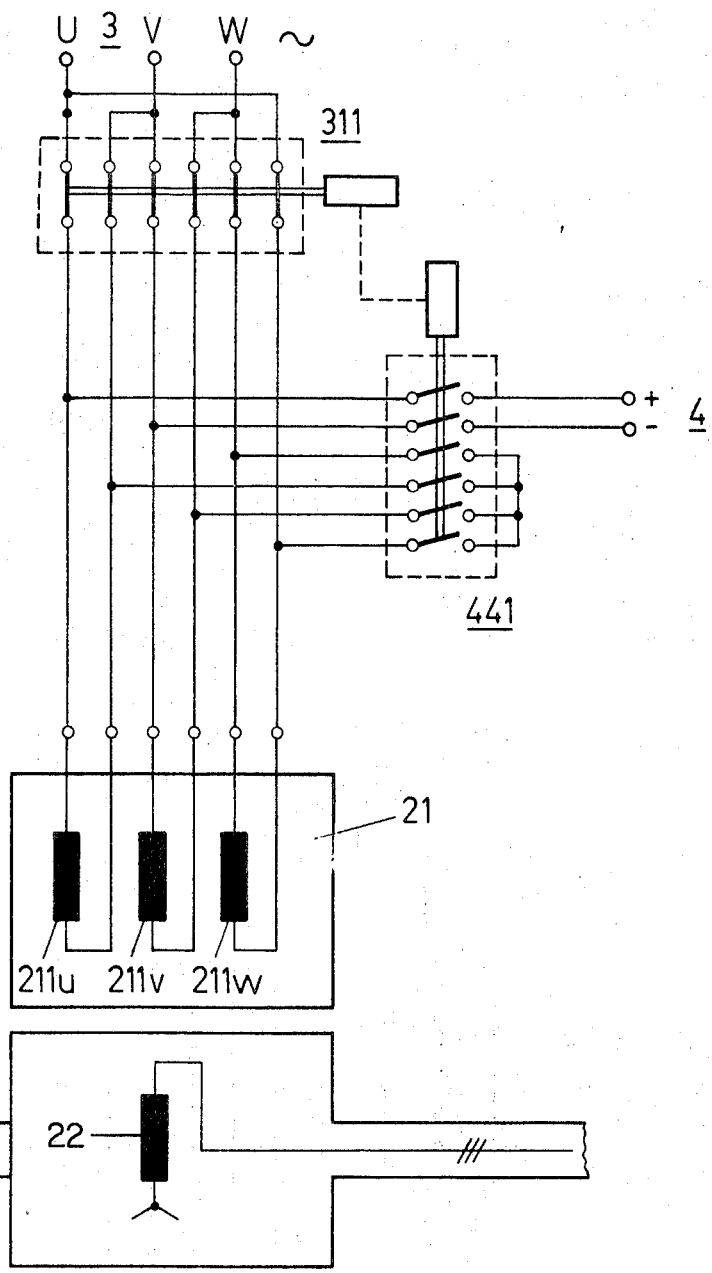
Figure 7:
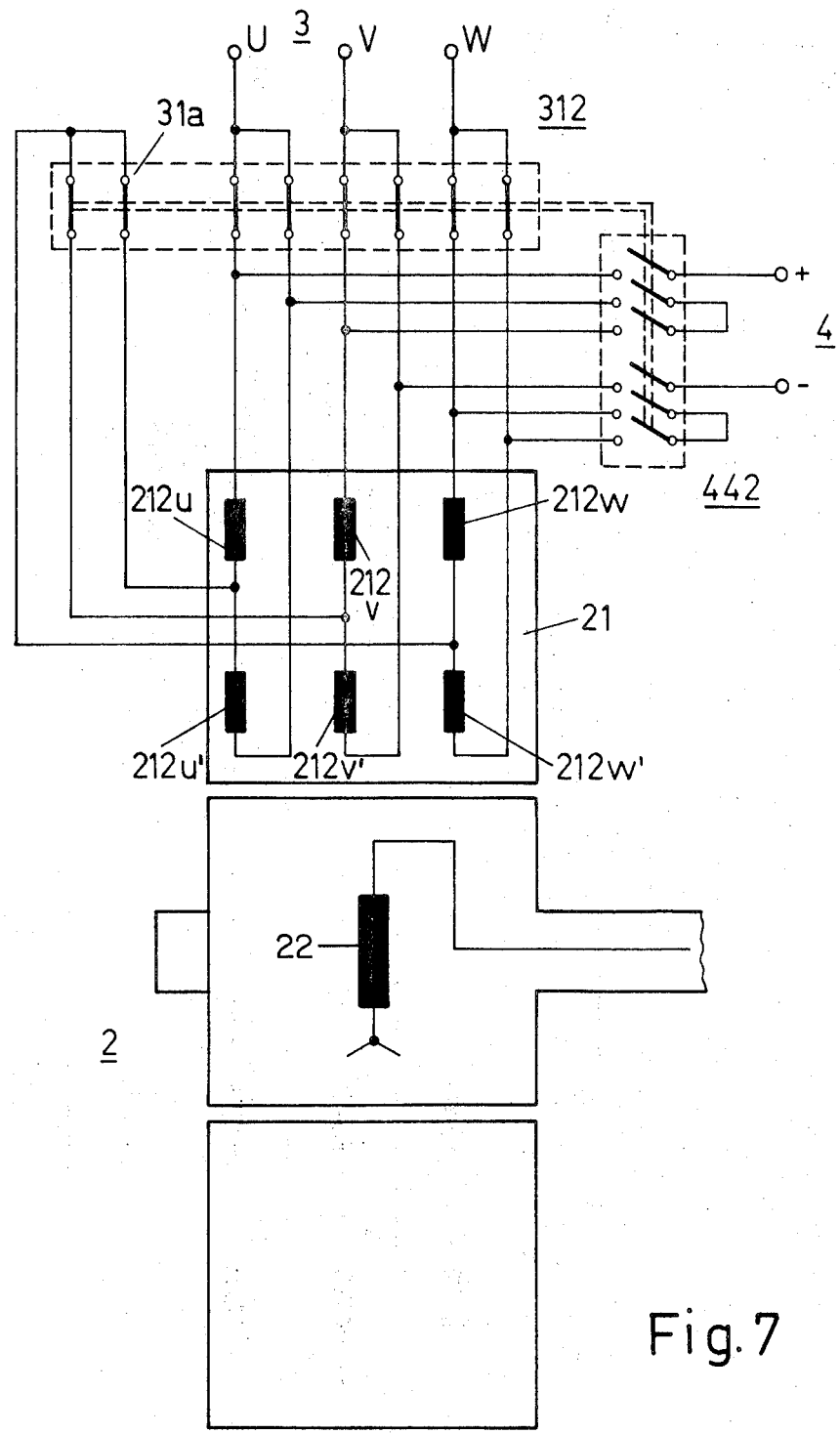

The invention is explained further with reference to the examples of embodiment illustrated diagrammatically in the drawings. In these:

FIGS. 1 – 4 each show the basic circuit diagram of one embodiment of the starting device according to the invention, FIG. 5 shows a star-star connection change for the stator winding of a starting and exciting induction machine, FIG. 6 shows a delta-star connection change for the stator winding of a starting and exciting induction machine and FIG. 7 shows a parallel-series connection change for the stator winding of a starting and exciting induction machine.

In the embodiments shown in FIGS. 1 to 4, a synchronous machine 1, for example a motor or a generator with a prime mover not illustrated, as well as a starting and exciting induction machine 2 with a three-phase supply network N are consistently provided. Substantially only the rotor 10 with exciting winding 11 is indicated of the synchronous machine in each case, and the rotor 20 with star-connected rotor winding 22 and stator winding 21 of the induction machine. The two rotors are mechanically connected to one another by a rigid coupling 6. Connected to the power supply N, for the stator winding of the induction machine, there is on the one hand a three-phase feed 3 with switch 31 and on the other hand a direct-current excitation 4 with mains transformer 41 and controlled rectifier 42 as well as associated control device 43 and with a switch 44 which is closed in normal operation. The last-mentioned switch is coupled in opposition to the switch 31 of the three-phase feed 3, as is indicated in FIG. 1 by the broken line between the two switches. As indicated diagrammatically in FIG. 1, the switch 31 is constructed at the same time as a star-delta starting switch for the stator winding 21, which latter is connected to the output of the rectifier 42 in a star connection when the switch 44 is closed and the switch 31 is open as a result of said coupling.

Figure 2:
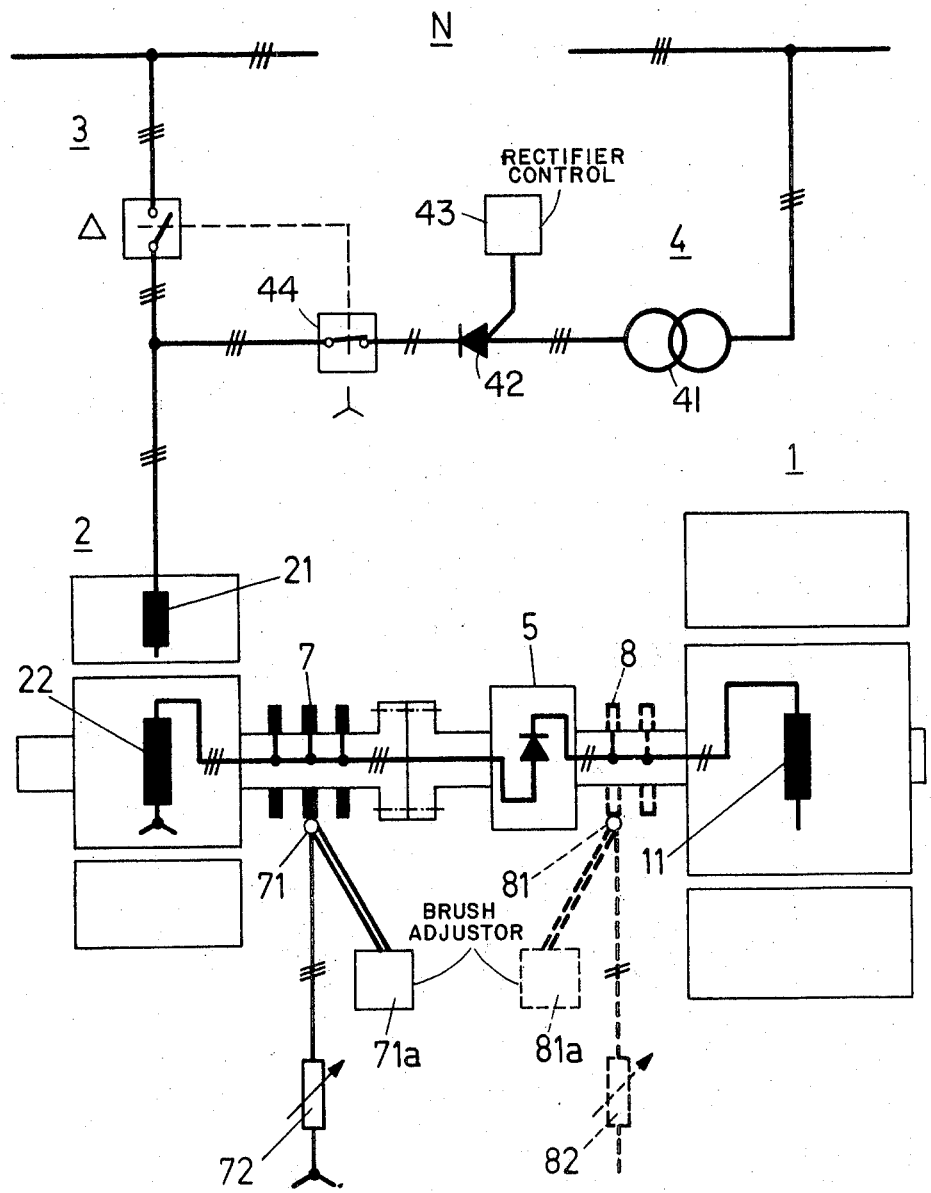

The common components of all the embodiments illustrated are provided with the same reference numerals in each case — insofar as they are again indicated in FIGS. 2 to 4.

In the embodiment shown in FIG. 1, which to this extent represents a particularly simple solution, the three-phase rotor winding 22 of the induction machine 2 is connected to the two-phase rotor winding 11 of the synchronous machine 1 through a static rectifier 5. The latter may, for example, be constructed in a conventional bridge circuit and is constructed mechanically, for example in the form of a co-rotating part mounted on the shaft of the synchronous machine or in the rotor of the synchronous machine. Such a rectifier arrangement together with the necessary control means therefor are known to the art and a complete disclosure of one suitable embodiment thereof can be found in Swiss Pat. No. 451,296 granted May 15, 1968. Electromechanical parts subject to wear, such as slip rings or switches are absent here.

The mode of operation of this embodiment is as follows:

For the starting, switch 31 is closed and switch 44 open (opposite to the switching state shown in FIG. 1). The starting operation is initiated by closing a main switch $N_1$. If constructed in the form of a star-delta switch, switch 31 is initially in its star position, not indicated, with respect to the stator winding 21. The induction motor 2 now works as an asynchronous motor with its rotor circuit closed through rectifier 5 and exciting winding 11 of the synchronous machine 1. In the rotor circuit, the slip energy of the induction machine, produced during the acceleration of the rotors, is converted into heat and drawn off to the outside. When a specific intermediate speed is reached, switch 31 is changed over into its delta position, not illustrated, with respect to the stator winding 21. When, after further acceleration of the rotors, a speed is reached at which the synchronous machine - whether in the case of a synchronous motor or of a synchronous generator — can be connected to the power supply N without falling out of synchronism, the stator winding 12 of the synchronous machine is switched on through a mains switch $N_2$. Conventional auxiliary synchronizing equipment, not illustrated, may be used in the course of this. At the same time, switch 31 is opened and switch 44 closed, whereupon the stator winding 21 of the induction machine is excited with direct current through the rectifier circuit 4 and now works as a stator-excited synchronous generator. During the following normal operation, the three-phase current produced in the rotor circuit of the induction machine provides the excitation for the synchronous machine through the rectifier 5.

In the embodiment shown in FIG. 2, a starting-resistor system 72 is provided which can be controlled according to the run-up of the induction machine and is connected in parallel with the exciting circuit of the synchronous machine through a set of slip rings 7 connected to the rotor winding 22, and which permits a distribution of the slip energy and of the heat dissipation between the two circuits. A set of brushes 71, which can be lifted, with associated adjusting device 71a is provided for the set of slip rings 7. Alternatively, as indicated by broken lines in FIG. 2, a set of bipolar slip rings 8, connected to the direct-current side of the rectifier 5, with a set of brushes 81 which can likewise be lifted and associated adjusting device 81a as well as with a starting-resistor system 82 can also be provided. Offsetting the advantage of the simpler set of slip rings is the fact that all the slip output is conducted across the rectifier which must be made correspondingly more robust in dimensions. The starting operation takes place in the same manner as in the embodiment shown in FIG. 1. After the induction machine has been switched over to direct-current excitation, the set of brushes 71 or 81 is lifted so that the starting resistors are disconnected.

In the embodiment shown in FIG. 3, a set of slip rings 7, connected to the rotor winding 22, with a set of brushes 71 which can be lifted and a starting-resistor system 72, is again provided but the exciting circuit of the synchronous machine is connected to the rotor circuit of the induction machine through a co-rotating switch 23, for example an electro-mechanical switch which can be actuated by a stationary positioning element, or a centrifugal switch working automatically. The switch 23 is open at a low speed and closes when a predetermined speed is reached which allows the synchronous machine to be connected up to the mains. By this means, while the starting operation takes place without alteration otherwise, the effect is achieved that the exciting circuit of the synchronous machine is disconnected during the starting operation and therefore does not participate in the conversion of the slip output. Alternatively, instead of an electro-mechanical switch, a controlled rectifier 50 may be provided which can be turned on through a control line 51 with firing device 52 on the transition between the corresponding speed ranges, as indicated in broken lines in FIG. 3. The corresponding bridging of the switch 23 is indicated by the connection 24 in broken line. Furthermore, in the embodiment shown in FIG. 3, a separate set of brushes 73 is provided in the set of slip rings 7 for the connection of a measuring and monitoring device 74. Thus protective devices and overload safety devices of conventional kind (not illustrated) can be connected up without special expenditure, for the exciting circuit of the synchronous machine and/or for the rotor circuit of the induction machine.

The embodiment shown in FIG. 4 differs from those explained previously in that on the one hand — to this extent in accordance with the embodiment shown in FIG. 1 — no slip rings are necessary in the rotor circuit of the induction machine and on the other hand — to this extent in contrast to the embodiment shown in FIG. 1 — it is nevertheless unnecessary to dispense with starting resistors for the optimization of the starting operation. For this purpose, a co-rotating resistor system 9, coupled to the rotors of the set of machines, is provided, and a co-rotating switch 25 through which the connection between the resistors and the rotor winding of the induction machine is established during the start from a standstill. When a predetermined speed is reached, the switch 25 disconnects the starting resistors. If this switching speed coincides sufficiently accurately with that speed at which it is possible to connect the synchronous machine up to the mains, then the switching over of the stator circuit of the induction machine to the rectifier circuit 4 can be effected simultaneously, for example automatically through a switch which is likewise correspondingly speed-controlled.

Apart from this, during the starting operation, the exciting circuit of the synchronous machine can be disconnected from the rotor circuit of the induction machine by the controlled rectifier 50 with firing device 52, also indicated in FIG. 4. The starting operation may, however, also be staged so that during a first run-up period the resistor system 9 is switched on, and this is followed by a second run-up period with resistor system 9 disconnected and instead the exciting circuit of the synchronous machine switched on as a load resistance through the rectifier 50. During this second run-up period, the stator winding of the induction machine is still connected to the alternating-current circuit 3 of the mains N so that the induction machine is still working as an asynchronous motor. At a further predetermined switching speed, on the one hand the stator winding of the induction machine is then switched over to direct-current excitation and the synchronous machine is connected to the mains.

The embodiment last described offers the advantage of freedom from mechanical parts subject to wear (slip rings), while a contactless connection with a static firing device or a co-rotating firing device actuated depending on speed may also be provided for the control of the rectifier 50.

In the example of an embodiment shown in FIG. 5, a stator winding 21 which has a fixed star connection is provided for the induction machine 2. Accordingly, during starting operation, the stator winding is connected to the three-phase feed 3 in a star connection through a switch 31, the direct-current excitation 4 being disconnected through the switch 44 coupled in opposition to the switch 31. For the changeover from starting operation to exciting operation, the switches 31 and 44 are switched over and as a result the three-phase feed is disconnected. At the same time, the phase windings 21u and 21v of the stator winding 21 are connected in series to the direct-current excitation 4 through the switch 44, while the phase winding 21w is short-circuited through the star point of the stator winding, which is brought out, and the lowest contact of the switch 44, and acts as damper winding of the induction machine now working as a synchronous generator. This embodiment offers the advantage of a particularly simple circuit construction and of low expenditure on switching devices for the changeover between starting and exciting operation.

The starting-exciting switch-over shown in FIG. 6 is provided for a stator winding 21 of the induction machine, of which the phase windings 211u, 211v and 211w are designed for connection to the line voltages of the three-phase feed 3. With a given amplitude of the alternating magnetic flux and a given frequency, the number of series-connected turns of the phase windings is proportional to the amplitude of the applied alternating voltage so that with a given mains voltage there is a correspondingly higher number of turns for the above-mentioned design. Furthermore, because with a given exciting magnetic flux and a similar reluctance, the direct current necessary to produce the given exciting magnetic flux is inversely proportional to the number of turns through which this current flows, the given exciting magnetic flux can be produced with a lower direct current with the above-mentioned design. This lower current can be produced with the same conductor cross-section and a greater weight of copper corresponding to the higher number of turns, with a constant exciting voltage, that is to say with a lower excitation output, or with the same weight of copper and a smaller conductor cross-section and higher turn resistance corresponding to the higher number of turns, with a higher voltage and same excitation output. The last-mentioned possible embodiment offers the advantage, particularly in connection with the excitation of the induction machine through a static rectifier, that the reverse voltage, which is in any case comparatively high in ordinary commercial silicon diodes or thyristors, can be better utilized in favour of a lower current load, that is to say using types of valve which are economically more favourable.

In the circuit shown in FIG. 6, moreover, two switches 311 and 441 coupled in opposition are again provided for switching over the stator winding 21 between three-phase feed 3 and direct-current excitation 4. During exciting operation, the phase windings 211$u$ and 211$v$ are again connected in series, while the phase winding 211$w$ is short-circuited as a damper winding through an appropriate pair of contacts of the switch 441.

It should be noted that the series connection of two phase windings of the three-phase winding switched over to direct-current excitation, which is usual in itself for the generator operation of synchronized induction machines, enables the advantage of increasing the voltage for the direct-current excitation to be realized to an even greater extent, particularly in the present connection. In practice, there is a limit to the series-connection of phase windings with a view to the efficiency of the direct-current excitation because the increase in the voltage by connecting up further phase windings in series is not opposed by any corresponding increase in the fundamental wave.

The advantage, which applies in the present connection, of a winding design with a higher number of turns as explained above can also be achieved with a parallel connection of winding branches within the phase windings with a connection to the three-phase feed 3 as shown in FIG. 7. Here the phase-winding halves 212$u$ and 212$u'$, 212$v$ and 212$v'$ as well as 212$w$ and 212$w'$ as parallel branches during starting operation are, on the one hand interconnected to the star point through a pair of contacts 31$a$ of a switch 312 and on the other hand connected to the phase connections U, V, W of the three-phase feed 3. This parallel connection necessitates a correspondingly high number of turns in the design with a predetermined mains voltage. During exciting operation, the phase-winding halves 212$u$, 212$u'$, 212$v$ and 212$v'$ are connected to the direct-current excitation 4 through a switch 442 coupled in opposition to the switch 312, while the phase-winding halves 212$w$ and 212$w'$ are again short-circuited through a pair of contacts of the first-mentioned switch.

I claim:

1. In a starting device for a synchronous machine which comprises a rotor carrying a field winding and being coupled for rotation with the rotor of an induction machine which comprises a stator winding and a rotor winding, said induction machine serving alternatively as a starting motor and as an exciting generator, and wherein said starting device comprises switching means connecting the stator winding of said induction machine in the starting motor mode of operation to a polyphase alternating current source and in the exciting generator mode of operation to a direct-current source, the rotor winding of said induction machine being connected to the field winding of said synchronous machine at least in the exciting generator mode of operation through a rectifier, the improvement of the starting motor mode of operation of means providing a connection of the phase windings of the stator winding of said induction machine to the phase-to-phase voltages of said polyphase alternating current source, and the further improvement in the exciting generator mode of operation of means providing a connection of at least two phase windings of the stator winding of the induction machine in series to said direct current source.

2. In a starting device for a synchronous machine which comprises a rotor carrying a field winding and being coupled for rotation with the rotor of an induction machine which comprises a stator winding and a rotor winding, said induction machine serving alternatively as a starting motor and as an exciting generator, which starting device comprises switching means connecting the stator winding of said induction machine in the starting motor mode of operation to a polyphase alternating current source and in the exciting generator mode of operation to a direct-current source, the rotor winding of said induction machine being connected to the field winding of said synchronous machine at least in the exciting generator mode of operation through a rectifier, the improvement in the starting motor mode of operation of means providing for the stator winding of said induction machine comprising in each phase winding itself a connection of at least two winding branches in parallel with one another, and wherein said switching means are so arranged and connected to the stator winding of the induction machine as to switch over said winding branches in each phase winding to a connection in series with one another in the exciting generator mode of operation.

3. In a starting device for a synchronous machine which comprises a rotor carrying a field winding and being coupled for rotation with the rotor of an induction machine which comprises a stator winding and a rotor winding, said induction machine serving alternatively as a starting motor and as an exciting generator, and wherein said starting device comprises switching means connecting the stator winding of said induction machine in the starting motor mode of operation to a polyphase alternating current source and in the exciting generator mode of operation to a direct-current source, said starting device further comprising a rectifier interconnected to the electrical circuitry between the rotor winding of said induction machine and the field-winding of said synchronous machine, the improvement wherein said rectifier is of the controllable type and wherein control circuitry connected with said rectifier is provided so as to electrically separate the field winding of said synchronous machine from the rotor winding of said induction machine in the starting motor mode of operation.

4. In a starting device for a synchronous machine which comprises a rotor carrying a field winding and being coupled for rotation with the rotor of an induction machine which comprises a stator winding and a rotor winding, said induction machine serving alternatively as a starting motor and as an exciting generator, which starting device comprises switching means connecting the stator winding of said induction machine in the starting motor mode of operation to a polyphase alternating current source and in the exciting generator mode of operation to a direct-current source, and wherein said starting device further comprises a rectifier interconnected in the electrical circuitry between the rotor winding of said induction machine and the field-winding of said synchronous machine, the improvement wherein means are provided for electrically connecting the field winding circuit of said synchronous machine with the rotor winding of said induction machine as a starting load circuit therefor in the starting motor mode of operation.

* * * * *

UNITED STATES PATENT OFFICE
CERTIFICATE OF CORRECTION

Patent No. 3,823,357      Dated July 9, 1974

Inventor(s) JORG SAPPER

It is certified that error appears in the above-identified patent and that said Letters Patent are hereby corrected as shown below:

[73] Assignee: BBC BROWN BOVERI & COMPANY LIMITED

Baden, Switzerland

Signed and sealed this 8th day of October 1974.

(SEAL)
Attest:

McCOY M. GIBSON JR.
Attesting Officer

C. MARSHALL DANN
Commissioner of Patents